United States Patent [19]
Ma

[11] Patent Number: 5,719,935
[45] Date of Patent: Feb. 17, 1998

[54] CELLULAR TELEPHONE

[76] Inventor: Jong-Nam Ma, Myongji Apt. 102-201, #738-1 Kumho-dong, So-gu, Kwangju-Si, Rep. of Korea

[21] Appl. No.: 540,909

[22] Filed: Oct. 11, 1995

[30] Foreign Application Priority Data

Jul. 18, 1995 [KR] Rep. of Korea .......... 95-20981

[51] Int. Cl.$^6$ .............. H04M 1/00; H04R 5/00; H04R 25/00
[52] U.S. Cl. .............. 379/433; 379/428; 379/429; 379/433; 381/25; 381/68.5; 381/68.6; 381/68.7; 381/157; 381/183; 381/187
[58] Field of Search .............. 379/428, 429, 379/433; 381/25, 183, 187, 157, 68.5, 68.6, 68.7

[56] References Cited

U.S. PATENT DOCUMENTS

| | | | |
|---|---|---|---|
| 5,003,589 | 3/1991 | Chen | 379/433 |
| 5,224,076 | 6/1993 | Thorp | 368/10 |
| 5,369,788 | 11/1994 | Nagai | 455/90 |
| 5,499,292 | 3/1996 | Blander et al. | 379/433 |
| 5,504,813 | 4/1996 | Takasaki | 379/433 |

*Primary Examiner*—Jack Chiang
*Assistant Examiner*—Allan Hoosain
*Attorney, Agent, or Firm*—Birch, Stewart, Kolasch & Birch, LLP

[57] ABSTRACT

A cellular telephone having a telephone receiver of an improved structure suitable to effectively exclude noise in noisy places thereby allowing a user to clearly hear the voice of a speaker is disclosed. The telephone receiver of this cellular telephone has an earphone type of conical projection suitable to be inserted into an earhole. The conical projection protrudes from the center of a circular base slightly protruding from the upper portion of the body's front surface so that the base comes into close contact with an ear rim when the conical projection is inserted into the earhole. The telephone transmitter of this cellular telephone is slidably received in a lower portion of a telephone body so as to manually or automatically retract into or project out of the body.

6 Claims, 3 Drawing Sheets

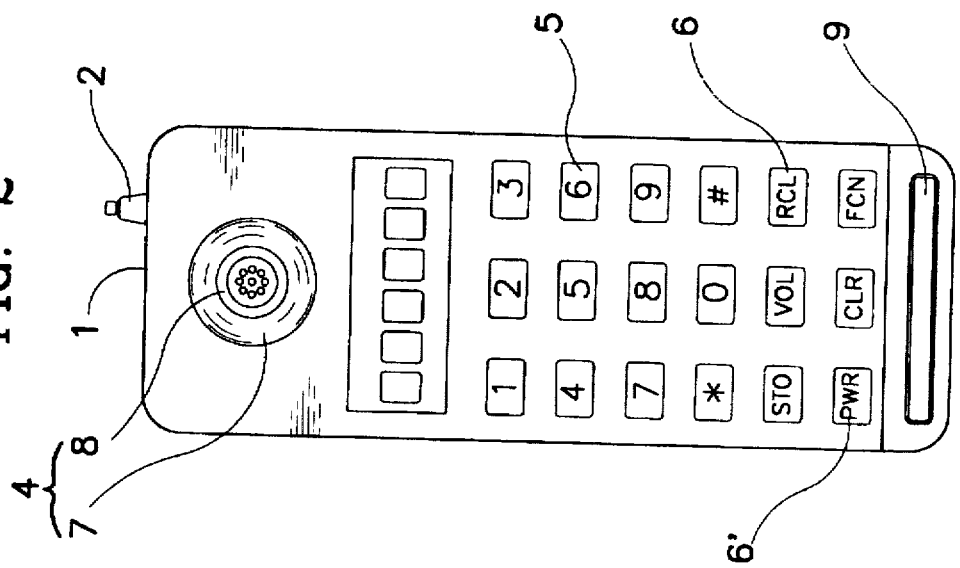
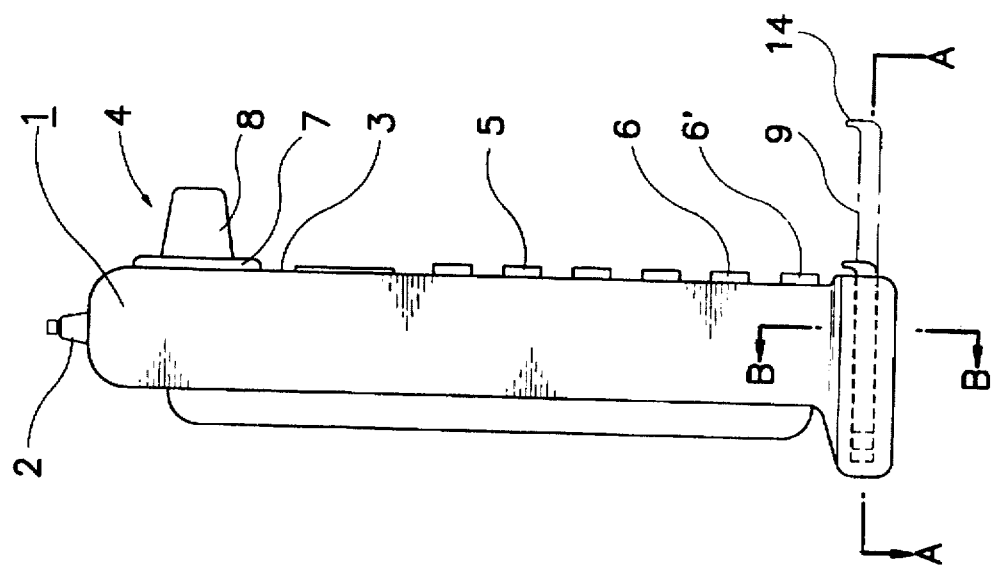

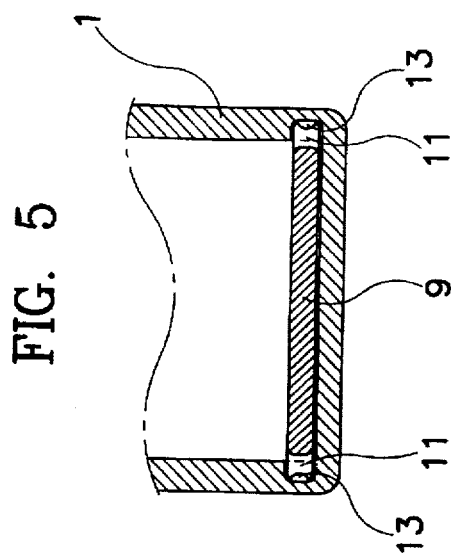
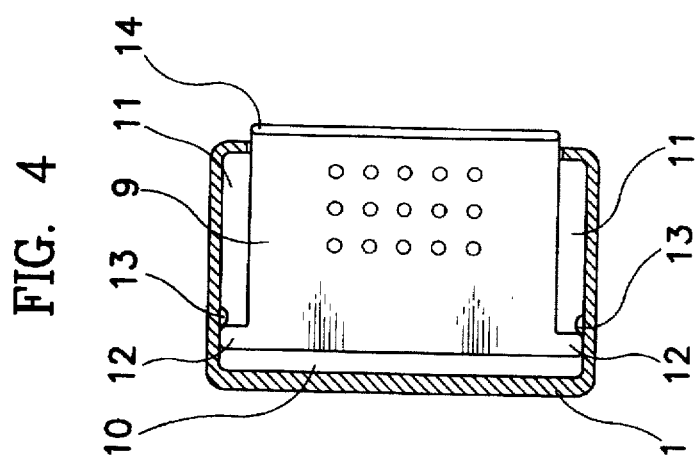
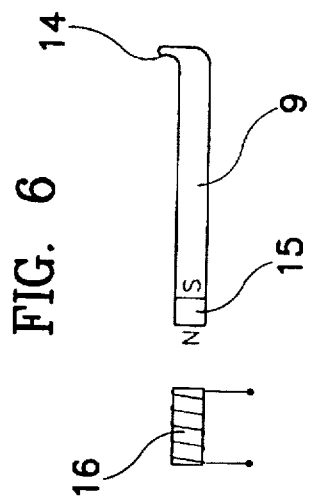
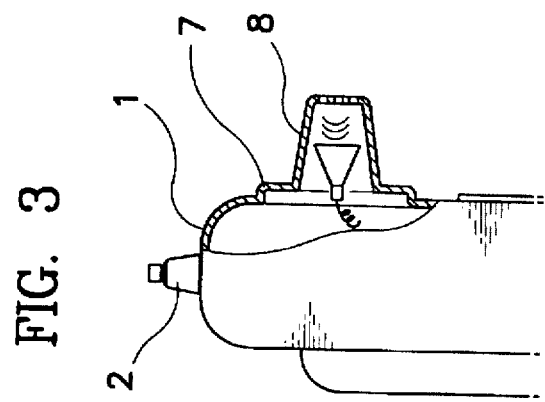

CELLULAR TELEPHONE

BACKGROUND OF THE INVENTION

1. Field of the Invention

The present invention relates to wireless telephones such as cellular or car telephones and, more particularly, to a structural improvement in such wireless telephones not only for effectively excluding noise in noisy places when talking over the phone, but also for providing a retractable telephone transmitter for the telephone.

2. Description of the Prior Art

FIGS. 7 and 8 show a typical cellular telephone. As shown in the drawings, a body 30 of the typical cellular telephone includes a telephone receiver 32 which is the microphone converting the audio-frequency current variations into sound waves. This receiver 32 is set on the upper portion of the body's front surface 31. The body's front surface 31 also includes a plurality of keys, that is, dial numeral keys 33 and various function keys 34. Pivoted to the bottom edge of the telephone body 30 by a hinge 35 is an openable telephone transmitter 36 which is the microphone for converting speech into audio-frequency electric signals.

The upper portion of the body's front surface 31 is partially concaved at a portion corresponding to the telephone receiver 32. A speaker 37 for producing a vibration sound is provided inside the concaved portion of the body 30. Partially concaving of the body's front surface 31 at the portion corresponding to the receiver 32 is for not only allowing the receiver 32 to be closely put to a user's ear, but also for preventing the vibration sound of the speaker 37 from scattering.

As the transmitter 36 is pivoted to the bottom edge of the body 30 by the hinge 35 as described above, the transmitter 36 is closed to be used as a protecting cover for the keys 33 and 34 when the phone is not being used. However, when talking over the telephone, the transmitter 36 is opened and positioned in front of the user's mouth thereby easily receiving the user's speech.

However, the cellular telephones are not used in a fixed place but are typically used in noisy and congested places such as subway trains and congested streets. In this regard, the typical cellular telephone having the simple concaved receiver cannot effectively exclude noise in the noisy places so that the voice produced by the speaker 37 may be drowned out by the noise. When the voice of the speaker is drowned out by the noise, the user naturally talks over the phone in a louder voice thereby unwillingly inconveniencing those around the user.

SUMMARY OF THE INVENTION

It is, therefore, an object of the present invention to provide a cellular telephone in which the above problems can be overcome and which is provided with a telephone receiver of an improved structure suitable to effectively exclude noise in noisy places thereby allowing a user to clearly hear the voice of a speaker.

It is another object of the present invention to provide a cellular telephone which includes a retractable telephone transmitter which can retract into and project out of the telephone's body.

In order to accomplish the above object, the present invention provides a cellular telephone comprising a telephone receiver having an earphone type of conical projection suitable to be inserted into an earhole; and a telephone transmitter slidably received in a lower portion of a telephone body so as to manually or automatically retract into or project out of the body.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a side view of a cellular telephone in accordance with an embodiment of the present invention;

FIG. 2 is a front view of the cellular telephone of the present invention;

FIG. 3 is an enlarged sectional view of a telephone receiver of the above cellular telephone;

FIG. 4 is a sectional view showing a retractable structure of a telephone transmitter taken along the section line A—A of FIG. 1;

FIG. 5 is a sectional view showing the retractable structure of the telephone transmitter taken along the section line B—B of FIG. 1;

FIG. 6 is a schematic view showing a retractable structure of the telephone transmitter in accordance with another embodiment of the present invention;

DESCRIPTION OF THE PREFERRED EMBODIMENT

Figure 8:
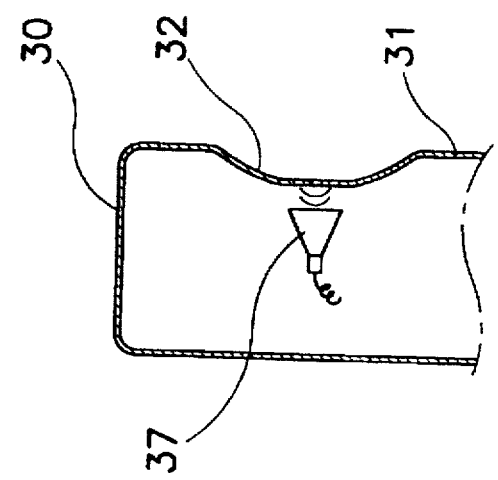
FIG. 8 is a partially sectioned view of the typical cellular telephone, showing a telephone receiver part of the cellular telephone.
Figure 7:
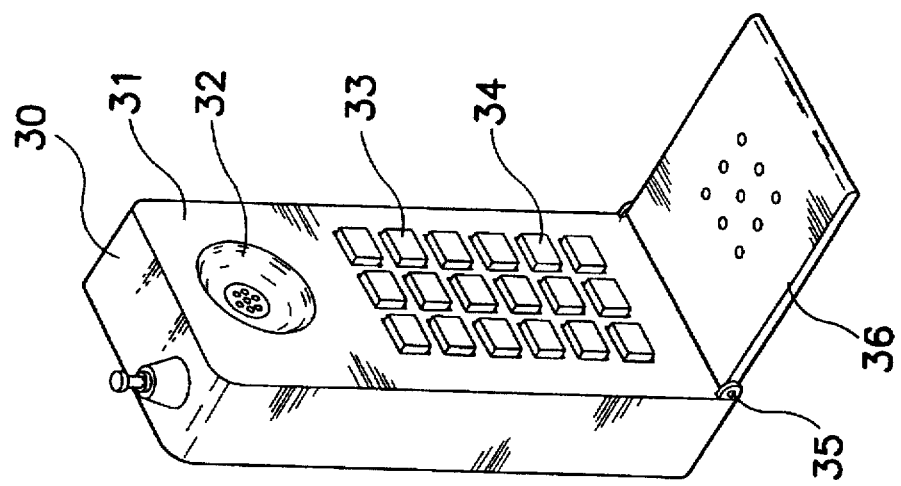
FIG. 7 is a perspective view of a typical cellular telephone.

FIG. 1 is a side view of a cellular telephone in accordance with an embodiment of the present invention. FIG. 2 is a front view of the above cellular telephone. FIG. 3 is an enlarged sectional view of a telephone receiver of the above cellular telephone.

In the above drawings, the reference numeral 1 denotes a telephone body 1 which includes an electronic circuit device for telephone conversation. An extendible antenna 2 is provided on a top side of the body 1. The telephone body 1 includes an earphone type of telephone receiver 4. This telephone receiver 4, which is the microphone converting the audio-frequency current variations into sound waves, protrudes from the upper portion of the body's front surface 3. The middle portion of the body's front surface 3 includes a plurality of keys, that is, dial numeral keys 5 and various function keys 6. A retractable telephone transmitter 9 is slidably received in a horizontal slit formed in the bottom portion of the body 1. The above transmitter 9 will fully retract in the body's bottom portion as shown in the dotted line of FIG. 1 when the phone is not being used. However, the transmitter 9 will slidably project out of the body's bottom portion as shown in the dots and dashes of FIG. 1 when talking over the phone.

The above telephone receiver 4 includes a circular base 7 slightly protruding from the upper portion of the body's front surface 3. The receiver 4 also includes an earphone type of projection 8 protruding from the center of the base 7. The above projection 8 has a frusto-conical configuration suitable to be smoothly inserted into a user's earhole. When the conical projection 8 is inserted in the user's earhole, the base 7 comes into close contact with a user's ear rim and effectively excludes noise in noisy places.

The bottom portion of the body 1 slightly protrudes toward the back of the body 1 as best seen in FIG. 1 and has the horizontal slit 10 for slidably receiving the telephone transmitter 9. As shown in FIGS. 4 and 5, a guide groove 11 for guiding the slidable movement of the transmitter 9 is formed on each side of the slit 10. The opposite sides of the transmitter 9 are provided with guide projections 12 which are brought into slidable engagement with the opposite guide grooves 11 of the slit 10 respectively. Therefore, the transmitter 9 can horizontally slide under the guide of the grooves 11 thereby projecting out of or retracting into the slit 10. In order to prevent the transmitter 9 from suddenly projecting out of the slit 10 when the phone is not being used, a pair of stoppers 13 are formed on the grooves 11 at the front of the transmitter's guide projections 12 respectively. The above stoppers 13 may comprise small protrusions or plate springs. The front of the transmitter 9 has a handle flange 14 for handling the transmitter 9 when drawing the transmitter 9 out of the slit 10. When the transmitter 9 fully retracts into the slit 10, the handle flange 14 is always placed outside the body's front surface 3.

In the above embodiment, the transmitter 9 is manually drawn out of the slit 10 of the body 1. However, the transmitter 9 may be automatically drawn out of the slit 10. In this case, a permanent magnet 15 is fixed to the rear end of the transmitter 9, while an electronic magnet 16 is mounted to the rear end of the slit 10 as shown in FIG. 6. The above electronic magnet 16 is selectively activated in accordance with a pushing motion of a power key 6'. That is, the electronic magnet 16 either attracts or repulses the permanent magnet 15 of the transmitter 9 in accordance with a pushing motion of the power key 6' thereby causing the transmitter 9 to automatically retract into, or project out of the slit 10.

If described in detail, when the power key 6' is turned on prior to talking over the phone, the magnetic pole of the electronic magnet 16 becomes the same magnetic pole as that of the permanent magnet 15. In this case, the permanent magnet 15 repulses the electronic magnet 16 and automatically draws the transmitter 9 out of the body's slit 10. When the power key 6' is turned off after using the phone, the magnetic pole of the electronic magnet 16 changes into a magnetic pole opposite to that of the permanent magnet 15. In this case, the permanent magnet 15 attracts the electronic magnet 16 and automatically retracts the transmitter 9 into the body's slit 10. Alternatively, the transmitter 9 may be manually retracted into the slit 10, while the transmitter 9 is automatically drawn out of the slit 10 by the magnetic repulsion between the magnets 15 and 16. In this case, the electronic magnet 16 is turned off and attracted by the magnetic force of the permanent magnet 15 when the transmitter 9 is manually retracted into the slit 10.

Of course, it should be understood that the slidable movement of the transmitter 9 inside the slit 10 may be automatically performed using another automatic mechanism such as a solenoid, a rack and pinion mechanism or a drive belt mechanism. In this case, the above automatic mechanism may be operated in accordance with a pushing motion of the power key.

In order to talk over the above cellular telephone, the telephone transmitter 9 is manually or automatically drawn out of the slit 10. Thereafter, the telephone is placed relative to the user's head in such a manner that the conical projection 8 of the telephone receiver 4 is inserted into the user's earhole. The voice of the receiver 4 in the above state is directly transmitted to the user's eardrum, while the noise in noisy places is effectively excluded by the base 7 brought into close contact with the user's ear rim. Therefore, it is possible to clearly hear the voice of the receiver 4. As the telephone transmitter 9 can retract into the telephone body 1 after using the phone, the cellular telephone of this invention also has a pleasant appearance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cellular telephone comprising: a telephone body;

a telephone receiver provided on an upper portion of a front planar surface of said body, said receiver converts audio-frequency electric current variations into sound waves;

a plurality of numeral keys and function keys provided on a middle portion of said body's front planar surface; and a telephone transmitter provided on a lower portion of said body, said telephone receiver comprises a frustro-conical projection suitable to be inserted into an earhole, said frustro-conical projection having a substantially conical midsection with a first diameter at one end and a second diameter at a second end, the second diameter being larger than the first diameter, said frustro-conical projection protrudes from a center of a circular base cylindrical section slightly protruding from the upper portion of the body's front planar surface so that said circular base cylindrical section comes into close contact with an ear rim when the frustro-conical projection is inserted into the earhole, said circular base cylindrical section having a third diameter, the third diameter being larger than the second diameter of said frustro-conical projection, said circular base cylindrical section, said numeral keys and function keys lying in the same plane of said front planar surface, and said frustro-conical projection substantially reduces external noise relative to said sound waves emanating from said receiver.

2. A cellular telephone according to claim 1, wherein said telephone body contains a slit for slidably receiving said telephone transmitter; said slit having guide grooves for receiving guide projections located on said telephone transmitter.

3. A cellular telephone according to claim 2, wherein said grooves have a pair of stoppers to prevent said transmitter from suddenly projecting out of said slit.

4. A cellular telephone according to claim 2, wherein said telephone transmitter further comprises a flange on a front surface of said transmitter for drawing said transmitter out of said slit.

5. A cellular telephone according to claim 2, wherein said front planar surface of said telephone body further comprises a power key for selectively activating an electronic magnet means for automatically projecting or retracting said telephone transmitter.

6. The cellular telephone of claim 1, wherein said receiver includes a speaker, said speaker being substantially enclosed by said circular base cylindrical section and said frustro-conical projection.

* * * * *